(12) United States Patent
Sawashima

(10) Patent No.: US 9,791,803 B2
(45) Date of Patent: Oct. 17, 2017

(54) IMAGE FORMING APPARATUS HAVING MULTIPLE DRIVING FORCE TRANSMITTING DRIVE TRAINS

(71) Applicant: CANON KABUSHIKI KAISHA, Tokyo (JP)

(72) Inventor: Fumiya Sawashima, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/157,747

(22) Filed: May 18, 2016

(65) Prior Publication Data

US 2016/0349664 A1    Dec. 1, 2016

(30) Foreign Application Priority Data

May 29, 2015  (JP) ................................. 2015-110010
Apr. 19, 2016  (JP) ................................. 2016-083509

(51) Int. Cl.
*G03G 15/08* (2006.01)
*G03G 15/01* (2006.01)
(Continued)

(52) U.S. Cl.
CPC ..... *G03G 15/0808* (2013.01); *G03G 21/1647* (2013.01); *F16H 1/20* (2013.01); *G03G 15/0189* (2013.01)

(58) Field of Classification Search
CPC .......... G03G 15/0808; G03G 21/1647; G03G 15/0189; G03G 15/0896; F16H 1/20
(Continued)

(56) References Cited

U.S. PATENT DOCUMENTS 9,158,260 B2    10/2015  Suzuki et al.
2009/0214235 A1*  8/2009  Hattori ............... G03G 21/1864
                                                                    399/37
(Continued)

FOREIGN PATENT DOCUMENTS

JP    H07-319267 A    12/1995
JP    H11-15275 A    1/1999
(Continued)

OTHER PUBLICATIONS

European Search Report mailed Oct. 24, 2016, in related European Patent Application No. 16170523.1.

*Primary Examiner* — Sandra Brase
(74) *Attorney, Agent, or Firm* — Fitzpatrick, Cella, Harper & Scinto

(57) ABSTRACT

An image forming apparatus includes image forming portions for forming images on a photosensitive member with different color developers by developing rollers. Developing roller moving mechanisms include (i) a developing roller moving member for moving one of the developing roller between a first contacting position contacting an associated photosensitive member and a first separating position separated from the associated photosensitive member and (ii) a first driving force switch for switching between a first transmission state in which a driving force is transmitted to the developing roller moving member to move the developing roller of an image forming portion and a disconnected state in which the transmission of the driving force is disconnected. Driving forces transmitted to the developing roller moving members are supplied from first and second gear trains.

6 Claims, 7 Drawing Sheets

(51) Int. Cl.
  *G03G 21/16* (2006.01)
  *F16H 1/20* (2006.01)
(58) Field of Classification Search
  USPC .................................................. 399/228, 279
  See application file for complete search history.

(56) References Cited

U.S. PATENT DOCUMENTS

| | | | |
|---|---|---|---|
| 2010/0316413 A1* | 12/2010 | Murasaki ........... | G03G 15/0194 399/228 |
| 2012/0183332 A1* | 7/2012 | Shin ................... | G03G 15/0194 399/228 |
| 2013/0084105 A1 | 4/2013 | Suzuki | |
| 2014/0093273 A1* | 4/2014 | Hayakawa ......... | G03G 21/1619 399/111 |
| 2014/0369704 A1* | 12/2014 | Matsumoto .......... | G03G 15/043 399/53 |
| 2015/0104213 A1 | 4/2015 | Tajiri | |

FOREIGN PATENT DOCUMENTS

| JP | 2003-263004 A | 9/2003 |
|---|---|---|
| JP | 2006-292868 A | 10/2006 |
| JP | 2009-282126 A | 12/2009 |
| JP | 2012-194596 A | 10/2012 |
| JP | 2014-021194 A | 2/2014 |

* cited by examiner

IMAGE FORMING APPARATUS HAVING MULTIPLE DRIVING FORCE TRANSMITTING DRIVE TRAINS

FIELD OF THE INVENTION AND RELATED ART

The present invention relates to an image forming apparatus to which a process cartridge is detachably mountable, employing an electrophotographic type for forming an image on a recording material (medium).

Here, an electrophotographic image forming apparatus forms the image on the recording material by using the electrophotographic type. Further, examples of the electrophotographic image forming apparatus may include an electrophotographic copying machine, an electrophotographic printer (e.g., a laser beam printer, an LED printer or the like), a facsimile machine, a word processor, and the like.

Further, a process cartridge includes an electrophotographic photosensitive member and a process means, such as a charging means or a developing means, actable on the electrophotographic photosensitive member into a cartridge (unit), which is detachably mountable to an image forming apparatus main assembly.

An electrophotographic image forming apparatus, such as a printer, using an electrophotographic process electrically charges uniformly the electrophotographic photosensitive member as an image bearing member and then forms a latent image by selective exposure of the electrophotographic photosensitive member to light. Then, the latent image is developed with a developer by a developing roller to be visualized as a developer image. The developer image is then transferred onto the recording material. By applying heat and pressure to the transferred developer image, the developer image is fixed on the recording material, so that an image is recorded.

Conventionally, in order to prevent abrasion (wearing) and deterioration of the photosensitive member and the developing roller, a contact-and-separation mechanism for spacing the photosensitive member and the developing roller in a period other than during image formation has been known. For example, Japanese Laid-Open Patent Application (JP-A) 2006-292868 and JP-A 2009-282126 disclose a constitution in which developing (developing roller) contact-and-separation operations for respective colors are performed in a predetermined order by using a motor for developing (developing roller) spacing.

However, the constitution in which the contact-and-separation operation between the photosensitive member and the developing roller is performed using the exclusive motor invited an increase in cost of the motor itself and needed a space for permitting provision of the motor, and thus there was a problem that the apparatus was upsized.

Further, for example, in an image forming apparatus capable of forming color and monochromatic images using toners of colors of yellow (Y), magenta (M), cyan (C) and black (B), in the case where the order of execution of the above-described contact-and-separation operations was designated, the following problem arose. For example, the case where the order of all contact (color) in which all of the photosensitive members and all of the developing rollers are contacted to each other, color spacing (monochromatic) in which the photosensitive members for Y, M and C and the associated developing rollers are spaced from each other, and monochromatic spacing (all spacing) in which the photosensitive member for B and the associated developing roller are spaced from each other is designated will be described. In this order, there is a need that the photosensitive member for black and the associated developing roller are contacted to each other during color printing and even during non-printing in the case of black, so that a contact time of the photosensitive member for black with the associated developing roller becomes longer than necessary. In this case, a degree of abrasion of the photosensitive member for black and the associated developing roller progressed, so that there was a problem that a lifetime of the contact was shortened.

SUMMARY OF THE INVENTION

A principal object of the present invention is to provide an image forming apparatus having a constitution in which a plurality of developing rollers are independently moved toward and away from associated photosensitive members.

According to an aspect of the present invention, there is provided an image forming apparatus comprising: a first image forming portion for forming an image on a photosensitive member with a developer by a developing roller; a second image forming portion for forming an image on a photosensitive member with a developer, different in color from the developer in the first image forming portion, by a developing roller; a first gear train for transmitting a driving force to at least one of the developing roller and the photosensitive member which are provided in the first image forming portion; a second gear train for transmitting a driving force to at least one of the developing roller and the photosensitive member which are provided in the second image forming portion; a first developing roller moving mechanism including a first developing roller moving member for moving the developing roller of the first image forming portion toward an associated photosensitive member and first driving force switching means for switching between a transmission state in which the driving force from the first gear train is transmitted to the first developing roller moving member to move the developing roller of the first image forming portion and a disconnected state in which the transmission of the driving force is disconnected; and a second developing roller moving mechanism including a second developing roller moving member for moving the developing roller of the second image forming portion toward an associated photosensitive member and second driving force switching means for switching between a transmission state in which the driving force from the second gear train is transmitted to the second developing roller moving member to move the developing roller of the second image forming portion and a disconnected state in which the transmission of the driving force is disconnected.

Further features of the present invention will become apparent from the following description of exemplary embodiments with reference to the attached drawings.

DESCRIPTION OF THE EMBODIMENTS

Embodiments of the present invention will be specifically described with reference to the drawings. Dimensions, materials, shapes and relative arrangements of constituent elements described in the following embodiments should appropriately be changed depending on structures and various conditions of devices (apparatuses) to which the present invention is applied. Accordingly, the scope of the present invention is not intended to be limited to the following embodiments unless otherwise specified.

Embodiment 1

An image forming apparatus according to Embodiment 1 of the present invention will be described with reference to FIGS. 1 to 7.

Incidentally, in the following embodiments, as an electrophotographic image forming apparatus, a full-color electrophotographic image forming apparatus to which four process cartridges are detachably mountable is described as an example. However, the number of the process cartridges to be mounted in the image forming apparatus is not limited to four but may appropriately be set as desired. For example, in the case of an image forming apparatus for forming a monochromatic image, the number of the process cartridges to be mounted in the image forming apparatus is one.

Further, in the following embodiments, as an example of the image forming apparatus, a printer is exemplified. However, the image forming apparatus is not limited to the printer. The present invention is also applicable to, e.g., other image forming apparatuses such as a copying machine, a facsimile machine and a multi-function machine having functions of these machines in combination.

<General Structure of Image Forming Apparatus>

Figure 1:
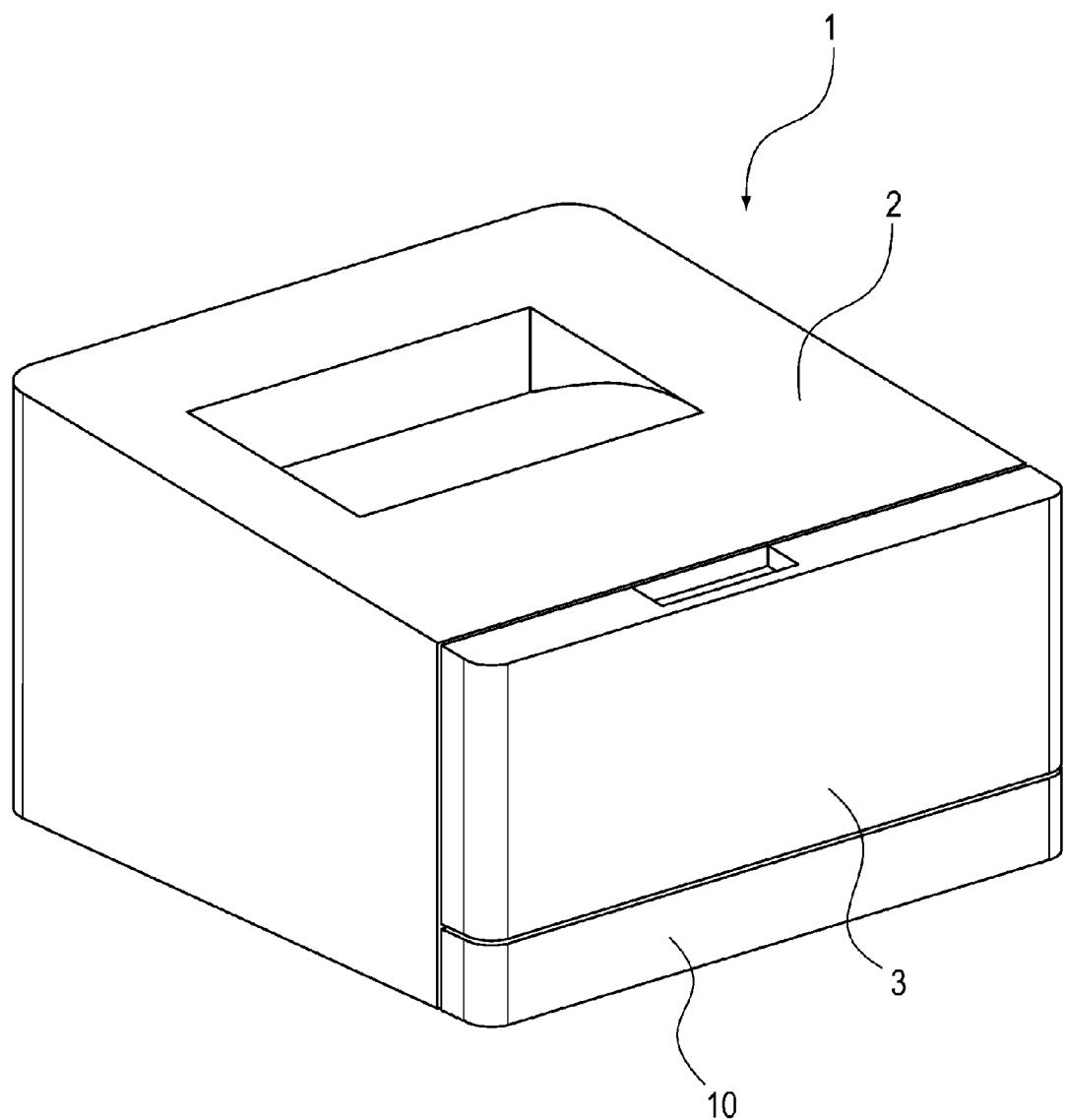
FIG. 1 is a perspective view showing an electrophotographic image forming apparatus according to the present invention.
Figure 2:
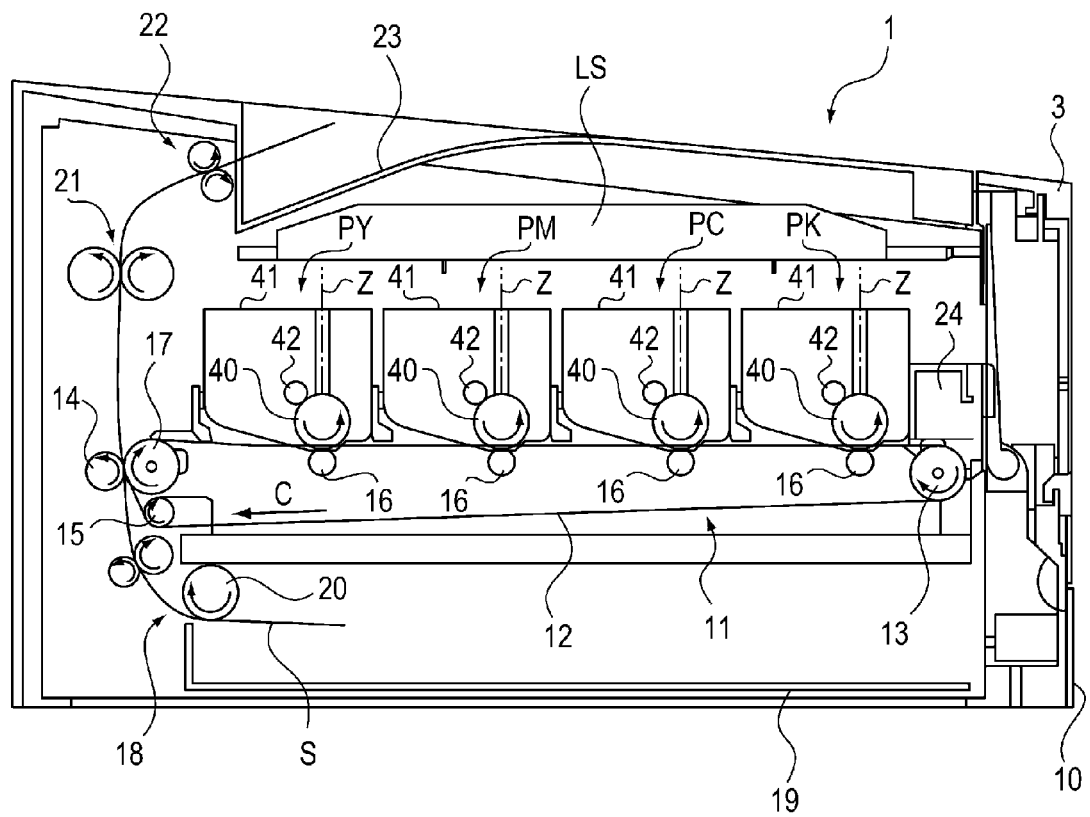
FIG. 2 is a schematic sectional view showing the electrophotographic image forming apparatus of the present invention.

First, general structure of the image forming apparatus will be described. FIG. 1 is a perspective view of an outer appearance of the image forming apparatus in this embodiment. FIG. 2 is a schematic sectional view of the image forming apparatus in this embodiment.

An image forming apparatus 1 is a four color-based full-color laser printer using the electrophotographic image forming process and effects color image formation on a recording material S. The image forming apparatus 1 is of a process cartridge type in which a process cartridge P is detachably mountable to an apparatus main assembly 2 and a color image is formed on the recording material S.

Here, with respect to the image forming apparatus 1, the side (surface) on which an apparatus openable door 3 and a feeding tray drawer 10 are provided is referred to as a front side (surface), and a side (surface) opposite to the front side (surface) is referred to as a rear side (surface). Further, a right side when the image forming apparatus 1 is viewed from the front surface is referred to as a driving side, and a left side is referred to as a non-driving side.

In the apparatus main assembly 2 of the image forming apparatus 1, four cartridges P consisting of a first cartridge PY, a second cartridge PM, a third cartridge PC and a fourth cartridge PK are provided and arranged in a horizontal direction. To the first to fourth cartridges P (PY to PK), a rotational driving force is transmitted from a drive output portion (not shown) of the apparatus main assembly 2. Further, to the first to fourth cartridges P (PY to PK), bias voltages (charging bias, developing bias and the like) are supplied from the apparatus main assembly 2 (not shown).

The respective first to fourth cartridge p (PY to PK) have the same electrophotographic process mechanism but contains developers (toners) different in color from each other.

The first cartridge PY accommodates the toner of yellow (Y) and forms the toner image of yellow on the surface of the photosensitive drum 40. The second cartridge PM accommodates the toner of magenta (M) and forms the image of magenta on the surface of the photosensitive drum 40. The third cartridge PC accommodates the toner of cyan (C) and forms the toner image of cyan on the surface of the photosensitive drum 40. The fourth cartridge PK accommodates the toner of black (K) and forms the toner image of black on the surface of the photosensitive drum 40.

Above the first to fourth cartridges P (PY, PM, PC, PK), a laser scanner unit LS as an exposure means is provided. This laser scanner unit LS outputs laser light Z correspondingly to image information. Then, the laser light Z passes through an exposure window portion of each cartridge P, so that the surface of the photosensitive drum 40 is subjected to scanning exposure to the laser light Z.

Under the first to fourth cartridges P (PY, PM, PC, PK), an intermediary transfer unit 11 as a transfer member is provided. This intermediary transfer unit 11 includes a driving roller 13, a turn roller 17 and a tension roller 15, and includes a transfer belt 12 extended and stretched by the three rollers 13, 17 and 15.

The photosensitive drum 40 of each of the first to fourth process cartridges P (PY to PK) contacts an upper surface of the transfer belt 12. A resultant contact portion is a primary transfer portion. Inside the transfer belt 12, primary transfer rollers 16 are provided opposed to the associated photosensitive drums 40.

Oppositely to the turn roller 17, a secondary transfer roller 14 is provided in contact with the transfer belt 12. A resultant contact portion between the transfer belt 12 and the secondary transfer roller 14 is a secondary transfer portion.

Below the intermediary transfer unit 11, a (sheet) feeding unit 18 is provided. This feeding unit 18 includes a (sheet) feeding tray 19 in which sheets of the recording material S are stacked, and includes a (sheet) feeding roller 20 for feeding the recording material S from the feeding tray 19.

In an upper left side of the apparatus main assembly 2 in FIG. 2, a fixing unit 21 and a (sheet) discharging unit 22 are provided. At an upper surface of the apparatus main assembly 2, a (sheet) discharge tray 23 is defined.

On the recording material S, the toner image is fixed by a fixing means provided in the fixing unit 21, and then the recording material S is discharged onto the discharge tray 23 by the discharging unit 22.

<Image Forming Operation>

An operation for forming a full-color image in the above-constituted image forming apparatus will be described.

The photosensitive drums 40 of the first to fourth cartridges P (PY to PK) are rotationally driven at a predetermined speed (in arrow directions in FIG. 2 and in the counterclockwise direction). The transfer belt 12 is also rotationally driven in the same direction (arrow C direction in FIG. 2) as the rotational direction of the photosensitive drums 40 (at their contact portions) at a speed corresponding to the speed of the photosensitive drums 40.

The laser scanner unit LS scans and exposes the surface of each photosensitive drum 40 with the laser light Z depending on an associated color image signal.

As a result, the electrostatic latent image depending on the image signal for the associated color is formed on the surface of the associated photosensitive drum 40. The thus formed electrostatic latent image formed on the surface of each photosensitive drum 40 is developed by a developing roller 42 which is provided in a photosensitive drum 40 and which is rotationally driven at a predetermined speed.

By the electrophotographic image forming process operation as described above, on the photosensitive drum 40 of the first cartridge PY, a yellow toner image corresponding to a yellow component for the full-color image is formed. Then, the toner image is primary-transferred onto the transfer belt 12.

Similarly, on the photosensitive drum 40 of the second cartridge PM, a magenta toner image corresponding to a magenta component for the full-color image is formed. Then, the toner image is primary-transferred superposedly onto the yellow toner image which has already been transferred on the transfer belt 12.

Similarly, on the photosensitive drum 40 of the third cartridge PC, a cyan toner image corresponding to a cyan component for the full-color image is formed. Then, the toner image is primary-transferred superposedly onto the yellow and magenta toner images which have already been transferred on the transfer belt 12.

Similarly, on the photosensitive drum 40 of the fourth cartridge PK, a black toner image corresponding to a black component for the full-color image is formed. Then, the toner image is primary-transferred superposedly onto the yellow, magenta and cyan toner images which have already been transferred on the transfer belt 12.

In this way, unfixed toner images of yellow, magenta, cyan and black for the four color-based full-color image are formed on the transfer belt 12.

On the other hand, at predetermined control timing, sheets of the recording material S are separated and fed one by one. The sheets of the recording material S accommodated in the feeding tray 19 are separated and fed one by one by the feeding roller 20. The recording material S is introduced into the secondary transfer portion which is the contact portion between the secondary transfer roller 14 and the transfer belt 12 at predetermined control timing.

As a result, in a process in which the recording material S is conveyed to the secondary transfer portion, the four color toner images superposed on the transfer belt 12 are collectively transferred onto the surface of the recording material S.

<Mounting and Demounting Constitution of Cartridge>

Figure 3:
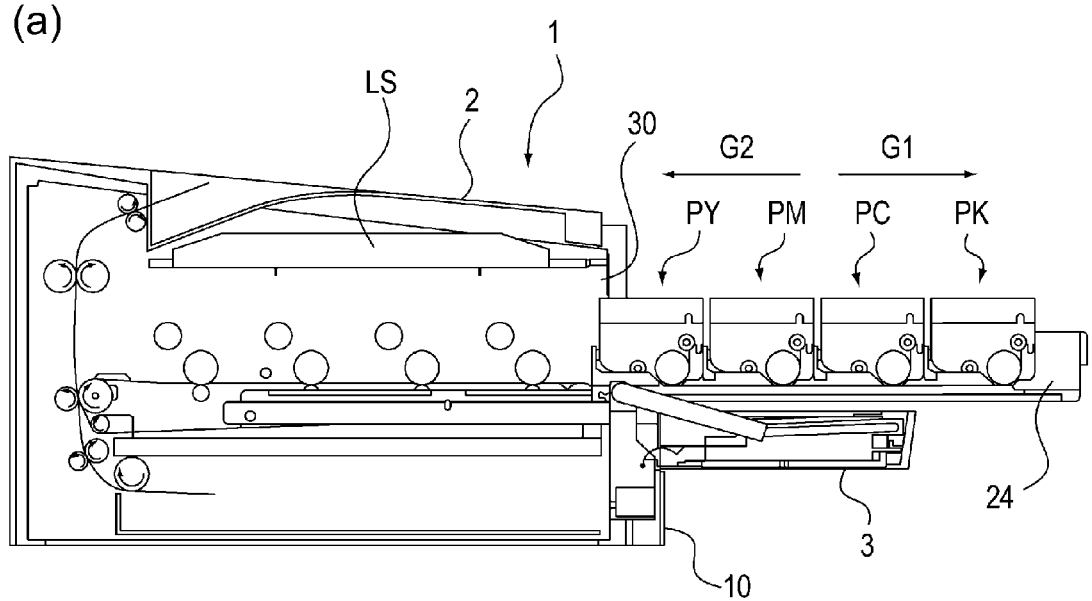
In FIG. 3, (a) and (b) are sectional views showing a demounting and mounting operation of a cartridge of the image forming apparatus of the present invention.
Figure 3:
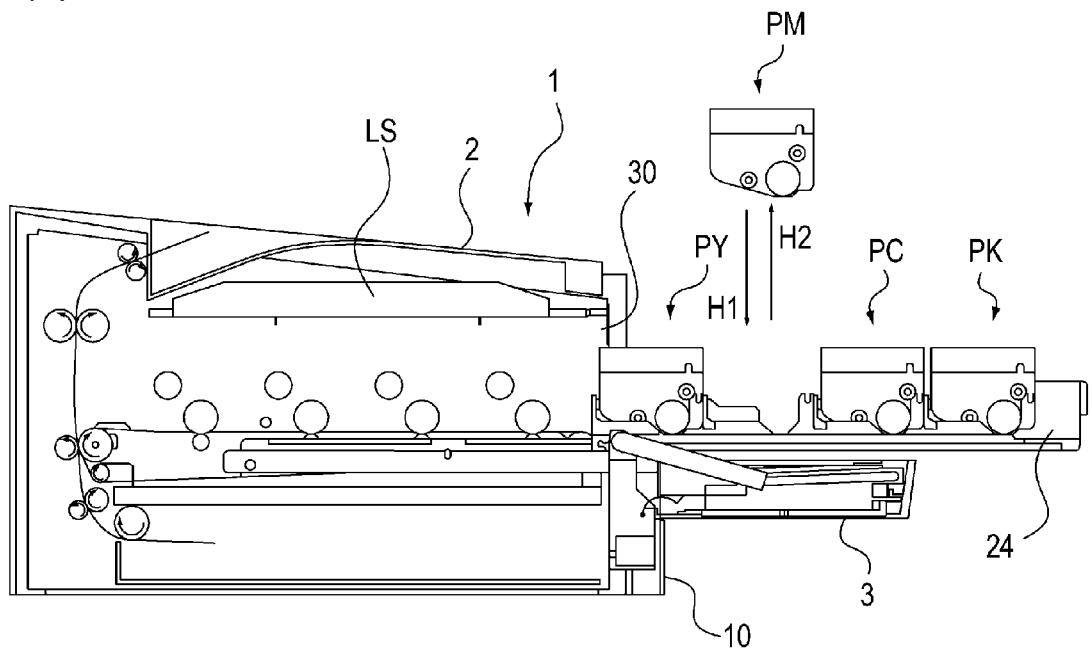

Next, a mounting and demounting operation of the cartridges P (PY, PM, PC, PK) with respect to the apparatus main assembly 2 will be described using (a) and (b) of FIG. 3. In FIG. 3, (a) is a schematic sectional view showing a state in which a cartridge tray 24 is pulled out from the apparatus main assembly 2 through opening 30 and thus each cartridge P is detachably mountable to the cartridge tray 24. In FIG. 3, (b) is a schematic sectional view for illustrating an operation by which the cartridge P is demounted from and mounted into the cartridge tray 24.

Inside the apparatus main assembly 2, the cartridge tray 24 in which the cartridges P are mountable is provided. The cartridge tray 24 is, as shown in (a) of FIG. 3, constituted so as to be linearly movable (pushable and pullable) in arrow G1 and G2 directions which are substantially the horizontal direction with respect to the apparatus main assembly 2.

Further, the cartridge tray 24 is capable of being in a mounted position in the apparatus main assembly 2, and in a pulled-out position where the cartridge tray 24 is pulled out from the mounted position.

First, the mounting operation for mounting the cartridges P (PY, PM, PC, PK) into the apparatus main assembly 2 will be described.

The apparatus openable door 3 is opened, and then the cartridge tray 24 is moved in G1 direction indicated by the arrow in (a) of FIG. 3 to be moved to the pulled-out position. In this state, the cartridge P is mounted in the cartridge tray 24 along an arrow H1 direction to be held. The cartridge tray 24 holding the cartridges P is moved in the arrow G2 direction shown in (a) of FIG. 3, so that the cartridge tray 24 is moved to the mounted position in the apparatus main assembly 2. Then, the apparatus openable door 3 is closed, so that the mounting operation of the cartridge P into the apparatus main assembly 2 is completed.

On the other hand, the demounting operation of each cartridge P from the apparatus main assembly 2 will be described. Similarly as in the mounting operation of the cartridge P into the apparatus main assembly 2 described above, the cartridge tray 24 is moved to the pulled-out position. In this state, the cartridge P is demounted along an arrow H2 direction shown in FIG. 3(b), so that the demounting operation of the cartridge P from the apparatus main assembly 2 is completed.

By the above-described operations, each cartridge P is detachably mountable to the apparatus main assembly 2.

<Outline of Driving Unit>

Next, a structure of a main driving unit 70 in this embodiment will be described.

Figure 4:
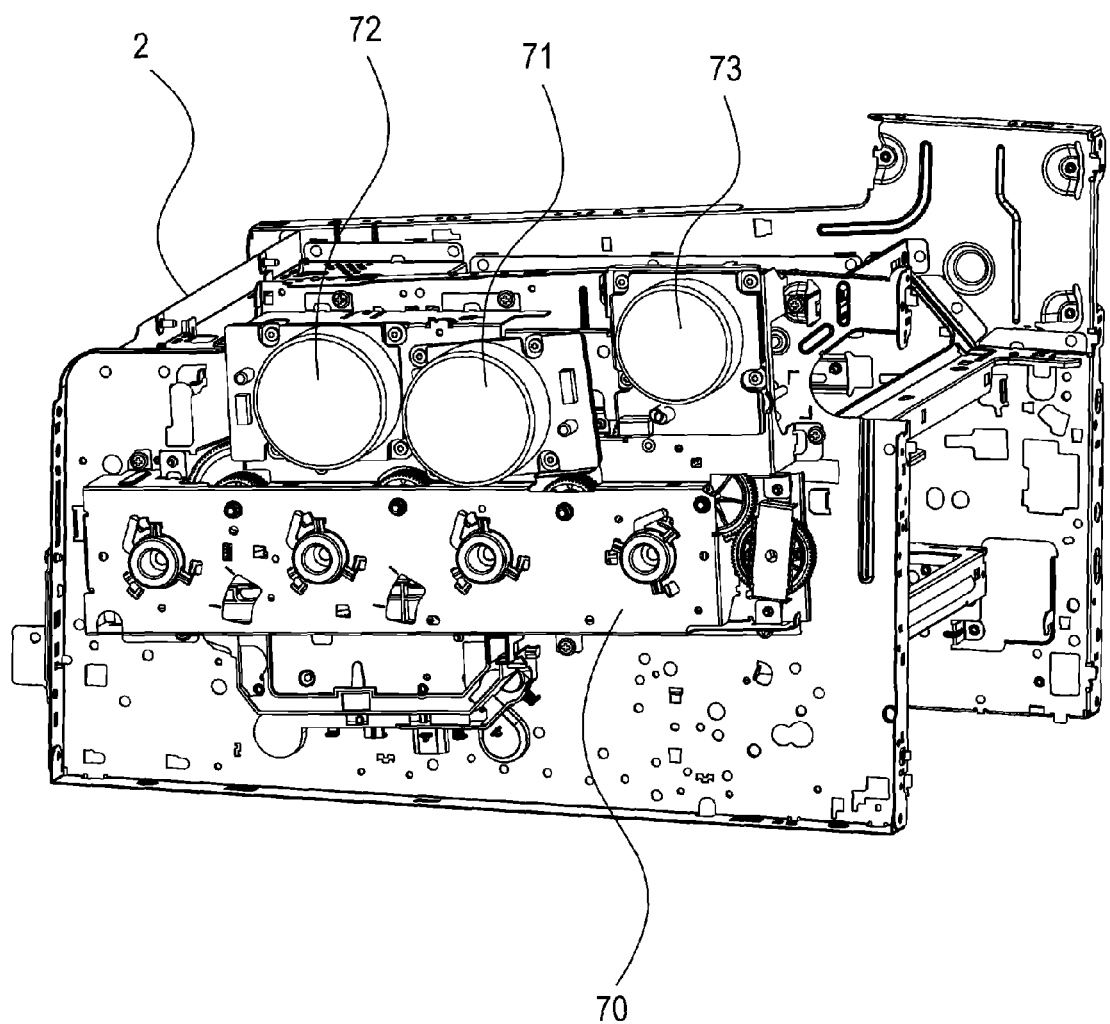
FIG. 4 is a perspective view showing a mounted state of a main driving unit in Embodiment 1.

FIG. 4 is a perspective view of the main driving unit 70 in a mounted state in the apparatus main assembly 2 as seen from an outside of the apparatus main assembly 2. In FIG. 4, for simplicity, only a main assembly frame of the apparatus main assembly 2 and the main driving unit 70 mounted to the apparatus main assembly 2 are illustrated. A driving force (drive) is transmitted to a drum motor 71 by a gear train inside the main driving unit 70, and the drum motor 71 transmits the driving force to the photosensitive drum 40 and the driving roller 13 of the intermediary transfer unit 11. On the other hand, a driving force is transmitted to a developing motor (driving source) 72 by a gear train inside the main driving unit 70, and the developing motor 72 transmits the driving force to the developing roller 42 and a developing (roller) contact-and-separation mechanism (developing (roller) moving mechanism) 60. Further, a fixing motor 73 transmits a driving force to a fixing unit 21 (FIG. 2).

<Developing Contact-and-Separation Mechanism>

Figure 5:
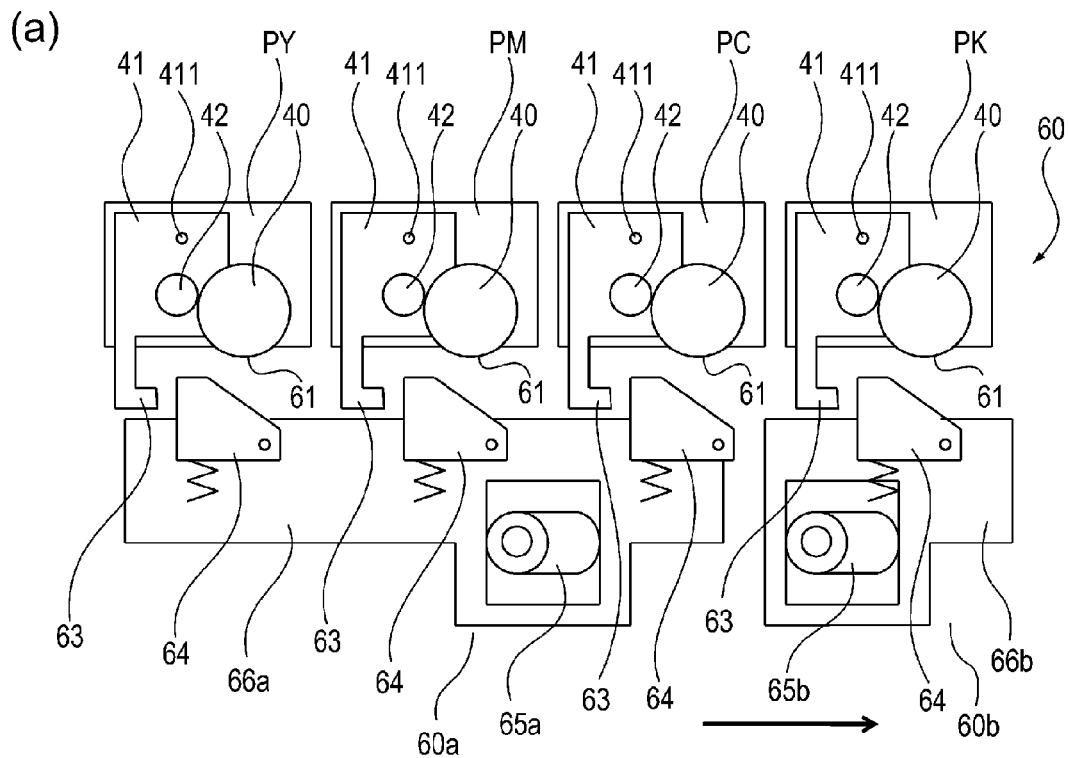
In FIG. 5, (a) and (b) are schematic side views of a developing (developing roller) contact-and-separation mechanism in Embodiment 1.
Figure 5:
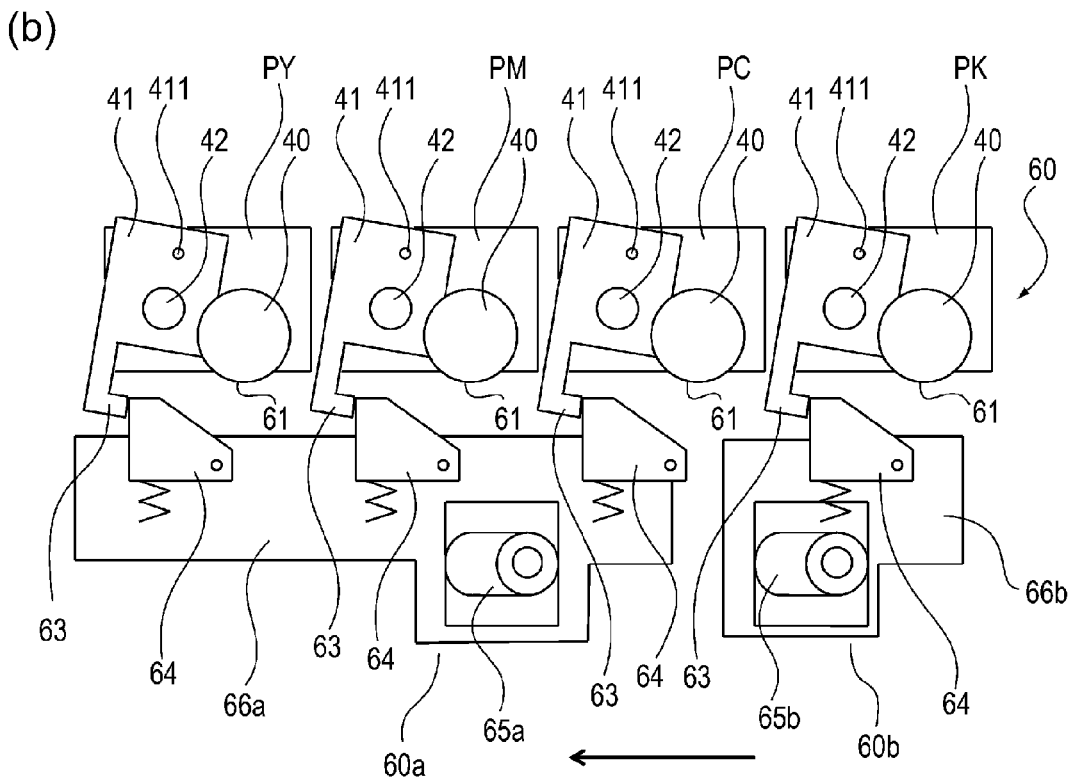

Next, a structure of the developing contact-and-separation mechanism 60 in this embodiment will be described using (a) and (b) of FIG. 5. In FIG. 5, (a) and (b) are schematic side views for illustrating the developing contact-and-separation mechanism 60.

In each cartridge P mounted in a mounting portion of the apparatus main assembly 2 in a predetermined manner, a developing device 41 is swung so that the developing roller 42 is contacted to and spaced (separated) from the photosensitive drum 40 by the developing contact-and-separation mechanism provided in the intermediary transfer unit 11. That is, the developing device 41 has a movable constitution relative to the photosensitive drum 40 and is movable between a contact position ((a) of FIG. 5) in which the developing roller 42 is contacted to the photosensitive drum 40 and a spaced position ((b) of FIG. 5) where the developing roller 42 is spaced from the photosensitive drum 40.

That is, the developing device 41 is swung in a contact direction with the photosensitive drum 40 immediately before start of development for each color in an image forming operation of the image forming apparatus 1, so that the developing roller 42 is contacted to the photosensitive drum 40 as shown in (a) of FIG. 5. Further, after the development, the developing device 41 is swung in a spaced direction from the photosensitive drum 40, so that the developing roller 42 is spaced from the photosensitive drum 40 as shown in (b) of FIG. 5. During stand-by when there is no print job, the developing device 41 is held in a spaced state as shown in (b) of FIG. 5.

Incidentally, in this embodiment, as a first image forming portion, the cartridges PY, PM, PC for forming images with toners of yellow (Y), magenta (M), cyan (C) are described as an example. Further, as a second image forming portion for forming an image with a toner different in color from the toners at the first image forming portion, the cartridge PK for forming the image with the toner of black (K) is described as an example.

By the above-described contact-and-separation operation of the developing device 41 (developing roller 42) relative to the photosensitive drum 40, life-time extension of the developing device 41 is realized. That is, the developing roller 42 is spaced from the photosensitive drum 40, a load exerted on the developing roller 42 decreases, so that the developing roller 42 can be used for a long term. Further, when the image is not formed, also movement of the toner from the developing roller 42 to the photosensitive drum 40 can be suppressed. An effect of the life-time extension is higher with a shorter contact time of the developing roller 42 with the photosensitive drum 40, and therefore such a sequence that the developing roller 42 is contacted to the photosensitive drum 40 immediately before the development and is spaced from the photosensitive drum 40 immediately after the development is desirable.

The developing contact-and-separation mechanism 60 in this embodiment will be described. In each cartridge P, the photosensitive drum 40 is rotatably shaft-supported by a frame of the cartridge P. The developing device 41 is supported rotatably (swingably) about a developing (roller) pivot 411 by the frame of the cartridge P. That is, the developing device 41 is supported so as to be capable of being contacted to and spaced from the photosensitive drum 40.

Further, in a state in which the cartridge P is mounted in the mounting portion of the apparatus main assembly 2 in the predetermined manner, a drum bearing portion 61 of the frame of the cartridge P is urged toward the apparatus main assembly 2 by an unshown urging mechanism and thus is positioned and fixed to the apparatus main assembly 2.

Relative to the positioned and fixed frame of the cartridge P, the developing device 41 is swung about the pivot 411 by the developing contact-and-separation mechanism 60, so that the developing roller 42 is changed in state between a contact state with the photosensitive drum 40 and a spaced state from the photosensitive drum 40.

The developing device 41 and the developing contact-and-separation mechanism 60 are engaged with each other by engagement between a spacing lever 63 provided to the developing device 41 and a spacing hook 64 provided to the developing contact-and-separation mechanism 60, so that a developing (roller) contact-and-separation operation is performed. Each spacing hook 64 is an engaging member engageable with the developing device 41 (spacing lever 63) of an associated cartridge P.

Next, a specific developing contact-and-separation operation will be described with reference to (a) and (b) of FIG. 5. The developing contact-and-separation mechanism 60 includes a first developing (roller) moving mechanism and a second developing (roller) moving mechanism. The second developing moving mechanism includes a second spacing mechanism 60b for moving a black side developing roller away or toward the associated photosensitive drum and a second driving force switching means. The first developing moving mechanism includes a first spacing mechanism 60a for moving color side developing rollers away or toward the associated photosensitive drums and a first driving force switching means. The second spacing mechanism 60b moves the developing roller of the cartridge PK to the spaced position from the photosensitive drum or the contact position with the photosensitive drum by transmission of a driving force from a developing gear train 78b which is a second gear train described later. The second driving force switching means will be described later but switches, by movement of contact and separation rod 66b, between a transmission state in which a driving force from the developing gear train 78b to a developing cam 65b of the second spacing mechanism 60b to move the black side developing roller and a disconnected state in which the transmission is disconnected. The first spacing mechanism 60a moves the developing rollers of the cartridges PY, PM, PC to the spaced position from the photosensitive drums or the contact position with the photosensitive drums by transmission of a driving force from a developing gear train 78a which is a first gear train described later. The first driving force switching means will be described later but switches between a transmission state in which a driving force from the developing gear train 78a to a developing cam 65a of the first spacing mechanism 60a to move the developing rollers of the cartridges PY, PM, PC and a disconnected state in which the transmission is disconnected. The second spacing mechanism 60b is an independent developing contact-and-separation mechanism separately from the first spacing mechanism 60a.

The developing contact-and-separation mechanism 60 is rotationally driven by input of the driving force from two portions of the main driving unit 70 of the apparatus main assembly 2 to the developing cams 65a, 65b. Incidentally, an input constitution of the driving force will be described later. The developing cam (first developing roller moving member) 65a performs the developing contact-and-separation operation of the developing devices 41 on a color side (cartridges PY, PM, PC). The developing cam (second developing roller moving member) 65b performs the developing contact-and-separation operation of the developing device 41 on the black side (cartridge PK).

First, the developing contact-and-separation operation on the color side will be described. The developing cam 65a is movable between a first position where the developing roller 42 of the developing device 41 contacts the photosensitive drum 40 and a second position where the developing roller 42 of the developing device 41 is spaced from the photosensitive drum 40. The developing cam 65a is rotationally driven to be switched to the first position or the second position, so that the position of the developing device 41 relative to the photosensitive drum 40 is switched to the contact position (corresponding to the first position) or the spaced position (corresponding to the second position).

By the developing cam 65a, a contact-and-separation rod 66a is driven with respect to a linear direction. The first position ((a) of FIG. 5) of the developing contact-and-separation mechanism 60 refers to a position where the contact position of the developing device 41 is permitted. The second position ((b) of FIG. 5) of the developing contact-and-separation mechanism 60 refers to a position where the developing contact-and-separation mechanism 60 holds the developing device 41 at the spaced position. Incidentally, the developing rollers provided at the plurality of image forming portions (second image forming portion), respectively, on the color side are simultaneously moved to the contact position or the spaced position relative to the photosensitive drums.

The contact-and-separation rod 66a is driven in a direction in which the spacing hook 64 provided to the contact-and-separation rod 66a is retracted from the spacing lever 63 provided to the developing device 41. In this case, as shown in (a) of FIG. 5, in each cartridge P, the developing roller 42 is changed in state to the contact state with the photosensitive drum 40.

Further, the contact-and-separation rod 66a is driven in a direction in which the spacing hook 64 contacts the spacing lever 63 provided to the developing device 41. In this case, as shown in (b) of FIG. 5, in each cartridge P, the developing roller 42 is changed in state to the spaced state from the photosensitive drum 40.

Incidentally, the developing contact-and-separation operation on the black side is substantially the same as the above-described developing contact-and-separation operation on the color side except that the developing device of the cartridge to be operated is different, and therefore description thereof will be omitted.

<Structure of Developing Gear Train)

Figure 6:
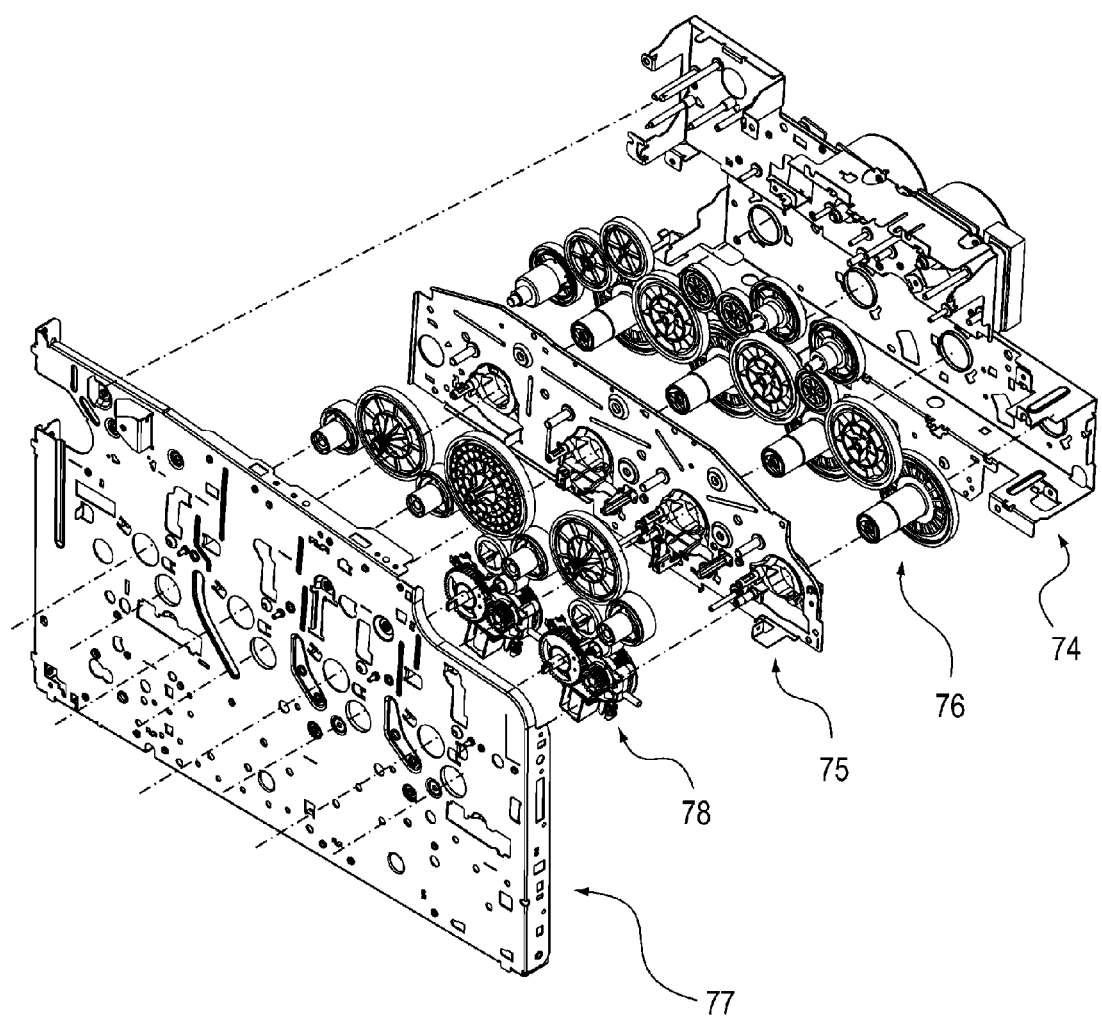
FIG. 6 is a perspective view showing the main driving unit in Embodiment 1.

FIG. 6 is a perspective view of the main driving unit 70. The main driving unit 70 principally includes a drum gear train 76 provided between a first driving frame 74 and a second driving frame 75 and the developing gear train 78 provided between the second driving frame 75 and a main assembly frame 77. Incidentally, a gear train relating to the developing contact-and-separation operation is the developing gear train 78, and therefore in this embodiment, detailed description of the drum gear train 76 will be omitted.

Figure 7:
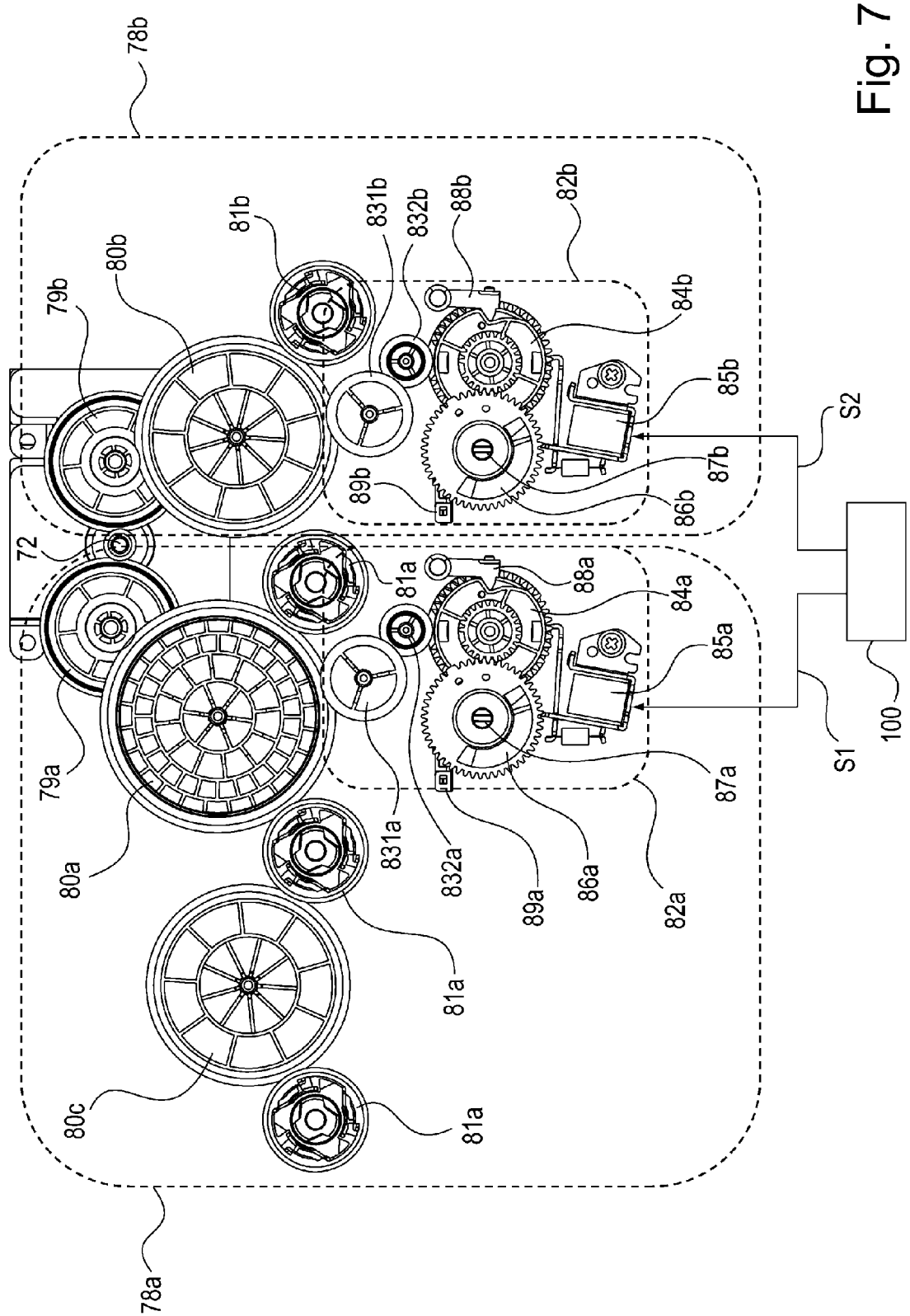
FIG. 7 is a top (plan) view showing a developing gear train in Embodiment 1.

Next, details of the developing gear train 78 will be described using FIG. 7. The developing gear train 78 includes the developing gear train 78a which is an image forming gear train on the color side and the developing gear train 78b which is an image forming gear train on the black side. The developing gear train 78a is a first gear train for transmitting the driving force to the developing rollers provided in the cartridges PY, PM, PC constituting the first image forming portion. The developing gear train 78b is a second gear train, independently of the first gear train, for transmitting the driving force to the developing roller provided in the cartridge PK constituting the second image forming portion. In this embodiment, as the first image forming portion, the cartridges PY, PM, PC which are a plurality of image forming portions are described as an example, but the number of the first image forming portion is not limited to three.

In the developing gear train 78, a developing motor 72 engages with stepped gears 79a, 79b of the developing gear trains 78a, 78b and the developing gear train 78 branches into the color side developing gear train 78a and the black side developing gear train 78b to transmit the driving force. Incidentally, the developing motor 72 as a single driving source is, as described above, a driving source for driving the developing rollers of the respective cartridges and also functions as a driving source for driving the developing contact-and-separation mechanism 60 as described later.

A developing idler gear 80b receiving the driving force from the stepped gear 79b transmits the driving force to each of a developing (roller) gear 81b and a developing (roller) contact-and-separation gear train 82b. On the other hand, a developing idler gear 80a receiving the driving force from the stepped gear 79a transmits the driving force to not only a developing (roller) contact-and-separation gear train 82a but also to three developing (roller) gears 81a and a developing idler gear 80c via a gear train. Here, the developing gear 81a (81b) is a drive transmitting member for transmitting the driving force to the developing roller of the associated cartridge P.

In this way, a constitution in which the color side developing contact-and-separation gear train 82a branches from the developing gear train 78a which is the color side image forming gear train and the black side developing contact-and-separation gear train 82b branches from the developing gear train 78b which is the black side image forming gear train is employed.

Next, a constitution and an operation of the developing contact-and-separation gear train 82a, 82b will be described. Incidentally, a constitution common to the developing contact-and-separation gear train 82a on the color side and the developing contact-and-separation gear train 82b on the black side is employed, and therefore in this embodiment, description will be made using the developing contact-and-separation gear train 82a which is the color side developing contact-and-separation gear train. The developing idler gear 80a receives the driving force from the developing motor 72 and transmits the driving force to double-partly tooth-omitted gears 84a via a first developing contact-and-separation idler gear 831a and a second contact-and-separation idler gear 832a.

The double-partly tooth-omitted gears (first partly tooth-omitted gear) 84a and a periphery thereof will be described. During a normal operation, a partly tooth-omitted portion of the double-partly tooth-omitted gears 84a opposes the second contact-and-separation idler gear 832a, and the second contact-and-separation idler gear 832a and the double-partly tooth-omitted gears 84a do not engage with each other, so that the second contact-and-separation idler gear 832a idles. That is, the driving force from the second contact-and-separation idler gear 832a to the double-partly tooth-omitted gears is disconnected. A solenoid (first moving member) 85a moves, depending on a signal inputted from the controller 100, an engaging position where the solenoid 85a engages with the double-partly tooth-omitted gears 84a and stops the rotation of the double-partly tooth-omitted gears 84a and a retracted position where the solenoid 85a retracts from the double-partly tooth-omitted gears 84a and the engagement is eliminated and thus the rotation of the double-partly tooth-omitted gears 84a is permitted. During a change in position of the developing contact-and-separation gear train, the solenoid 85a is energized in accordance with a first signal S1 from the controller 100, so that the solenoid 85a engages with the double-partly tooth-omitted gears 84a and thus the double-partly tooth-omitted gears 84a move the solenoid 85a in rest from the engaging position to the retracted position. As a result, the double-partly tooth-omitted gears 84a start rotation, so that a gear portion of the double-partly tooth-omitted gears 84a engages with the second developing contact-and-separation idler gear 832a. As a result, the double-partly tooth-omitted gears 84a receive the driving force from the second developing contact-and-separation idler gear 832a and thus rotates, so that the engagement with a lever 88a is eliminated. Further, by the rotation of the double-partly tooth-omitted gears 84a, the driving force is transmitted to a developing contact-and-separation gear 86a engaging with the double-partly tooth-omitted gears 84a and a developing contact-and-separation shaft 87a engaging with the developing cam 65a. In the same way, in the developing gear train 78b by rotation of the double-partly tooth-omitted gears 84b, the driving force is transmitted to a developing contact-and-separation gear 86b engaging with the double-partly tooth-omitted gears 84a and a developing contact-and-separation shaft 87b engaging with the developing cam 65b. Before one-full turn of the double-partly tooth-omitted gears 84a, in accordance with the signal S1 from the controller 100, the energization to the solenoid 85a is eliminated, so that the solenoid 85a is moved from the retracted position to the engaging position by an urging force of a spring. Then, the double-partly tooth-omitted gears 84a engage with the solenoid 85a and the lever 88a, so that the double-partly tooth-omitted gears 84a stop the rotation thereof at a position where the second contact-and-separation idler gear 832a in a normal state idles. As a result, the change in position of the developing contact-and-separation gear train is completed. Incidentally, a side belly portion of the developing contact-and-separation gear 86a has a cam shape, and a phase of the cam is detected by a micro-switch 89a (or a micro-switch 89b for the developing contact-and-separation gear 86b), so that the position of the developing contact-and-separation gear train is detected.

At the engaging portion between the double-partly tooth-omitted gears 84a and the developing contact-and-separation gear 86a, a gear ratio is 1:2. Accordingly, when the double-partly tooth-omitted gears 84a rotate one-full turn, the developing contact-and-separation gear 86a rotates almost ½ turn to switch between the contact position and the spaced position. When the double-partly tooth-omitted gears 84a rotates two-full turns, the developing contact-and-separation gear 86a rotates one-full turn, so that the position returns to an original position. For example, in the case where the developing roller contacts the photosensitive drum, when the double-partly tooth-omitted gears 84a rotate one-full turn, the developing contact-and-separation gear 86a rotates almost ½ turn, so that at the position is switched from the contact position to the spaced position. Then, when the double-partly tooth-omitted gears 84a further rotate one-full turn, the developing contact-and-separation gear 86a rotates one-full turn, so that the position returns from the spaced position to the contact position.

The constitution and the operation of the developing contact-and-separation gear train 82b are similar to those of the developing contact-and-separation gear train 82a. However, solenoids (moving members) 85a, 85b are controlled by separate first and second signals S1, S2, respectively, inputted from the controller 100, so that the solenoids 85a, 85b move between the engaging position with the double-partly tooth-omitted gears 84a, 84b and the retracted position from the double-partly tooth-omitted gears 84a, 84b, via levers 88a and 88b, respectively. Incidentally, on the basis of the first signal S1, an electric power supplying state (energization state/non-energization state) from the solenoid 85a to a coil is switched, and on the basis of the second signal S2, the electric power supplying state (energization state/non-energization state) from the solenoid 85b to a coil is switched. That is, timing when each of the solenoids 85a, 85b moves from the engaging position to the retracted position is independently controlled irrespective of a positional relationship between the solenoids 85a, 85b. That is, switching between a (transmission) state in which the driving force from the first developing contact-and-separation idler gear 832a to the developing cam 65a as the first developing roller moving member and a (disconnected) state in which the transmission is disconnected is made by the solenoid (first moving member) 85a and the double-partly tooth-omitted gears (first partly tooth-omitted gear) 84a which constitute a first driving force switching means. Further, switching between a (transmission) state in which the driving force from the second developing contact-and-separation idler gear 832b to the developing cam 65b as the second developing roller moving member and a (disconnected) state in which the transmission is disconnected is made by the solenoid (second moving member) 85b and the double-partly tooth-omitted gears (second partly tooth-omitted gear) 84b which constitute a second driving force switching means. Further, in accordance with the first signal S1 inputted from the controller 100, the first driving force switching means switches between the transmission state and the disconnected state by moving the solenoid 85a, and in accordance with the second signal S2 which is different from the first signal and which is inputted from the controller 100, the second driving force switching means switches between the transmission state and the disconnected state by moving the solenoid 85b. Accordingly, the first driving force switching means and the second driving force switching means can be independently controlled at necessary timing. That is, during the transmission state of the driving force to the developing cam 65a, the transmission state of the driving force to the developing cam 65b and the disconnected state of the transmission of the driving force to the developing cam 65b can be switched, and during the disconnected state of the transmission of the driving force to the developing cam 65a, the transmission state and the disconnected state with respect to the developing cam 65b can be switched. Further, during the transmission state of the driving force to the developing cam 65b, the transmission state and the disconnected state with respect to the developing cam 65a can be switched, and during the disconnected state of the transmission of the driving force to the developing cam 65b, the transmission state and the disconnected state with respect to the developing cam 65a can be switched. For this reason, a contact time between the photosensitive drum 40 and the developing roller 42 can be suppressed to a necessary minimum level, so that a degree of abrasion of the cartridge P can be reduced and thus a lifetime of the cartridge P can be prolonged. Particularly, the developing roller for black used with a high frequency can be contacted immediately before the development and can be spaced immediately after the development, and therefore an effect of lifetime extension can be maximized.

Incidentally, during the developing contact-and-separation operation, for example, an impact due to a fluctuation in load or the like is exerted on the developing contact-and-separation gear 86a and is transmitted to the upstream gear train, and thus rotation non-uniformity of the developing gear 81a is caused in some cases. When the rotation non-uniformity generates in the developing gear 81a during the image formation, an image defect such as a blurred image or density non-uniformity is caused to occur. However, in the case of this embodiment, the developing gear train 78a for the developing contact-and-separation gear train 82a is the same driving (gear) train, so that the image is not formed at timing of the contact-and-separation of the developing roller, and therefore the image defect is not caused. Further, the developing motor 72 directly branches into the color side gear train and the black side gear train, and therefore mutual impact does not have the influence on the image formation on the other side. For example, the impact of the black side developing contact-and-separation gear 86b is transmitted to the developing motor 72 before being transmitted to the color side developing gear 81a, but the developing motor 72 as the driving source is not influenced by such rotational fluctuation. For that reason, the impact on the black side is not transmitted to the color side developing gear. Accordingly, even when the contact-and-separation operation is performed independently irrespective of mutual position, an image quality is not influenced.

Further, using a single developing motor 72 for rotationally driving the developing rollers, the contact-and-separation between the developing roller and the photosensitive drum of the first image forming portion and the contact-and-separation between the developing roller and the photosensitive drum of the second image forming portion can be effected independently. For that reason, the above constitution is inexpensive compared with the constitution in which the contact-and-separation between the photosensitive drum and the developing roller is effected using an exclusive motor, and also there is no need to ensure a space where the exclusive motor is disposed, so that the image forming apparatus can be downsized.

Other Embodiment

Incidentally, in the above-described embodiment, for each of the two systems on the color side and the black side, the image forming gear train, the developing contact-and-separation gear train and the developing contact-and-separation mechanism are disposed, but the present invention is not limited thereto. For example, the system may also be divided into other dual systems such as a yellow-magenta system and a cyan-black system or may also be divided into 3 systems or 4 systems. Even such constitutions are employed, an effect similar to the above-described effect can be obtained.

Further, in the above-described embodiment, the color side system and the black side system are driven by the single driving source (motor), but a constitution in which a driving source is provided for each of the systems may also be employed.

Further, the constitution in which the developing gear train (developing driving train) 78 for transmitting the driving force to the developing roller driven by the developing motor 72 and the drum gear train (drum driving train) 76 for transmitting the driving force to the photosensitive drum driven by the drum motor 71 were separately disposed was described. However, the present invention is not limited thereto. A constitution in which the developing contact-and-separation gear trains 82a, 82b and the drum gear train (drum driving mechanism) 76 are driven by a single motor and the developing gear train (developing driving train) 78 is driven by another motor may also be employed. That is, a constitution in which the driving force is transmitted from a single motor to at least one of the developing roller and the photosensitive drum on the color side and the developing contact-and-separation gear train on the color side and in which the driving force is transmitted from the single motor to at least one of the developing roller and the photosensitive drum on the black side and the developing contact-and-separation gear train on the black side may only be required to be employed.

Further, in the above-described embodiment, the constitution using the 4 cartridges constituting the image forming portion was described as the example, but the number of the cartridges used is not limited to 4 and may appropriately be set as desired. Further, as the constitution including the plurality of image forming portions as the first image forming portion for forming the images with the developers different in color from the developer at the second image forming portion, the constitution using the 3 cartridges was described as the example, but also the number of the cartridges used is not limited to 3 and may only be required to be set appropriately.

Further, in the above-described embodiment, as the image forming apparatus, the printer was described as the example, but the present invention is not limited thereto. For example, the image forming apparatus may also be other image forming apparatus such as a copying machine, a facsimile machine and a multi-function machine having a combination of functions of these machines. Further, in the above-described embodiment, the image forming apparatus in which the intermediary transfer member is used and the toner images of the respective colors are successively transferred superposedly onto the intermediary transfer member and then are collectively transferred from the intermediary transfer member onto the recording material was described as the example. However, the image forming apparatus is not limited thereto, but may also be an image forming apparatus in which a recording material carrying member is used and toner images of the respective colors are successively transferred superposedly from the recording material carrying member onto the recording material. By applying the present invention to the contact-and-separation constitution between the photosensitive drum and the developing device in these image forming apparatuses, a similar effect can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2015-110010 filed on May 29, 2015, and 2016-083509 filed on Apr. 19, 2016, which are hereby incorporated by reference herein in their entirety.

What is claimed is:
1. An image forming apparatus comprising:
a first image forming portion for forming an image on a photosensitive member with a developer by a developing roller;
a second image forming portion for forming an image on a photosensitive member with a developer, different in color from the developer in the first image forming portion, by a developing roller;
a first gear train for transmitting a driving force to at least one of said developing roller and said photosensitive member which are provided in said first image forming portion;
a second gear train for transmitting a driving force to at least one of said developing roller and said photosensitive member which are provided in said second image forming portion;
a first developing roller moving mechanism including (i) a first developing roller moving member for moving the developing roller of said first image forming portion between a first contacting position contacting an associated photosensitive member and a first separating position separated from said associated photosensitive member and (ii) first driving force switching means for switching between a first transmission state in which a driving force is transmitted to said first developing roller moving member to move said developing roller of said first image forming portion and a first disconnected state in which the transmission of the driving force is disconnected; and a second developing roller moving mechanism including (i) a second developing roller moving member for moving said developing roller of said second image forming portion between a second contacting position contacting an associated photosensitive member and a second separating position separated from said associated photosensitive member and (ii) second driving force switching means for switching between a second transmission state in which a driving force is transmitted to said second developing roller moving member to move said developing roller of said second image forming portion and a second disconnected state in which the transmission of the driving force is disconnected, wherein the driving force transmitted to said first developing roller moving member in the first transmission state is supplied from said first gear train, and the driving force transmitted to said second developing roller moving member in the second transmission state is supplied from said second gear train.

2. An image forming apparatus according to claim 1, wherein the driving force is transmitted from a single driving source to said first gear train and said second gear train.

3. An image forming apparatus according to claim 1, wherein said first image forming portion includes a plurality of image forming portions for forming images on photosensitive members with developers different in color by associated developing rollers, wherein said first gear train transmits the driving force to said plurality of image forming portions, and wherein said first developing roller moving member moves said developing rollers provided at said plurality of image forming portions simultaneously to a spaced position or a contact position relative to associated photosensitive members, respectively.

4. An image forming apparatus according to claim 1, wherein said first driving force switching means includes a first partly tooth-omitted gear which is a gear engageable with a gear of said first gear train and which has a partly tooth-omitted portion which does not engage with the gear of said first gear train, and includes a first moving member for moving said first partly tooth-omitted gear to a position where said first partly tooth-omitted gear engages with the gear of said first gear train or a position where said first partly tooth-omitted gear does not engage with the gear of said first gear train by being moved in accordance with a first signal, and wherein said second driving force switching means includes a second partly tooth-omitted gear which is a gear engageable with a gear of said second gear train and which has a partly tooth-omitted portion which does not engage with the gear of said second gear train, and includes a second moving member for moving said second partly tooth-omitted gear to a position where said second partly tooth-omitted gear engages with the gear of said second gear train or a position where said second partly tooth-omitted gear does not engage with the gear of said second gear train by being moved in accordance with a second signal.

5. An image forming apparatus according to claim 1, further comprising a controller for outputting a first signal and a second signal, wherein said first driving force switching means switches between the first transmission state and the first disconnected state on the basis of the first signal, and said second driving force switching means switches between the second transmission state and the second disconnected state on the basis of the second signal.

6. An image forming apparatus according to claim 1, wherein the switching between the first transmission state and the first disconnected state by said first driving force switching means and the switching between the second transmission state and the second disconnected state by said second driving force switching means are independently executable.

* * * * *